United States Patent [19]

Bakk et al.

[11] 4,439,067

[45] Mar. 27, 1984

[54] METHOD OF LAYING AND JOINING PIPES AND A LIFTING DEVICE FOR PERFORMING THE METHOD

[75] Inventors: Thorleif Bakk; Henry Bakk, both of Oslo, Norway

[73] Assignee: deha Baubedarf GmbH & Co. KG, Grossgerau, Fed. Rep. of Germany

[21] Appl. No.: 318,567

[22] Filed: Nov. 5, 1981

[30] Foreign Application Priority Data

Nov. 10, 1980 [NO] Norway ................................. 803374

[51] Int. Cl.³ .............................................. F16L 1/00
[52] U.S. Cl. .................................... 405/154; 29/237; 254/29 R; 405/158; 405/169; 405/170
[58] Field of Search .............. 405/154, 158, 159, 168, 405/169, 170, 171; 29/238; 254/29 R

[56] References Cited

U.S. PATENT DOCUMENTS

| | | | |
|---|---|---|---|
| 2,793,424 | 5/1957 | Witte | 254/29 R |
| 2,920,383 | 1/1960 | Aydelott | 254/29 R |
| 3,711,938 | 1/1973 | Warren et al. | 405/170 |

*Primary Examiner*—Dennis L. Taylor

*Attorney, Agent, or Firm*—Holman and Stern

[57] ABSTRACT

A method for joining of pipes, especially large concrete pipes, heretofore been a comparatively cumbersome procedure necessitating the use of special tools by means of which a pressure has been exerted on the back end of the pipe to push it towards the last of the previously laid pipes. In order to simplify the laying and joining of the pipes, it is proposed wherein a pipe (1) which is to be joined to the last laid pipe (2) in the pipe line (3) is placed in alignment in front of the end of the last laid pipe (2), an asymmetrical two-legged lifting strap (10,11) is used, the shorter leg (10) of which is attached to pipe (1), which is to be joined to the last laid pipe (2) in the pipe line (3), at the end portion which is nearest to the joining end, the longer leg (11) of the lifting strap is attached to one of the previously laid pipes (2) of the pipe line (3), and to the point of connection (7) between the legs (10,11) there is connected a hoisting device (15) by means of which a slight vertical heave is effected, resulting in the pipe (1) being pulled in the direction towards the last laid pipe. The invention also includes the lifting strap capable of carrying out the pulling operation.

4 Claims, 4 Drawing Figures

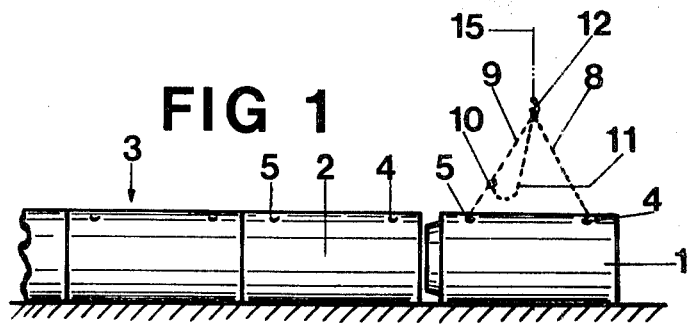
FIG 1
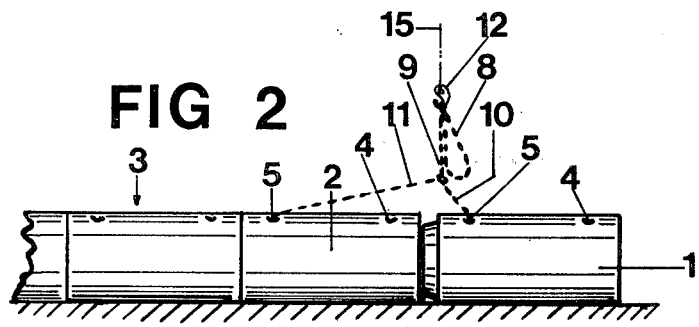
FIG 2
FIG 3
FIG 4
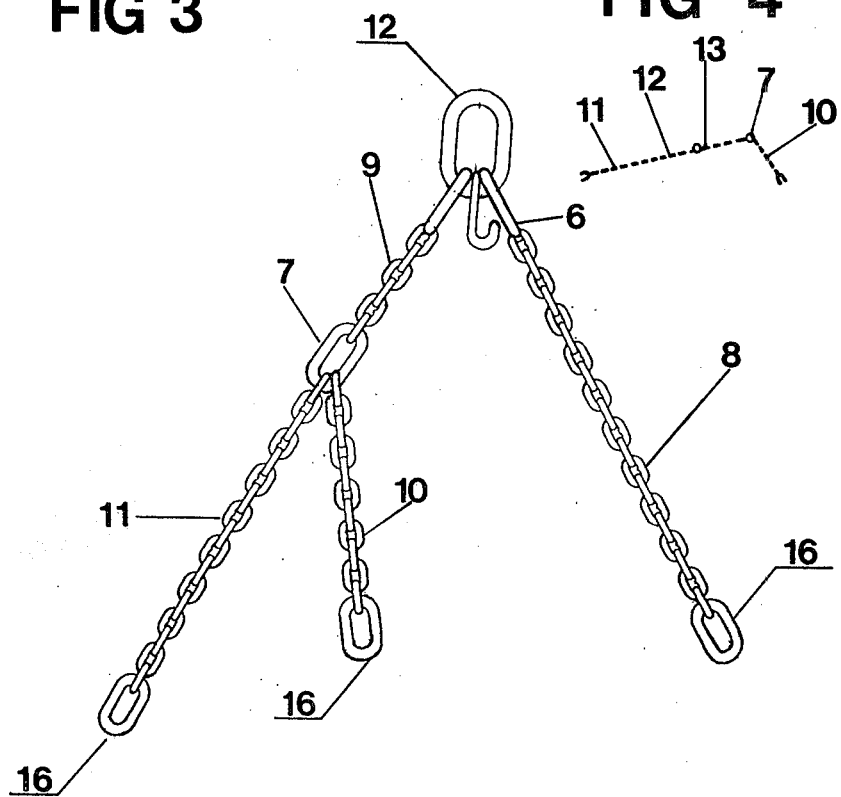
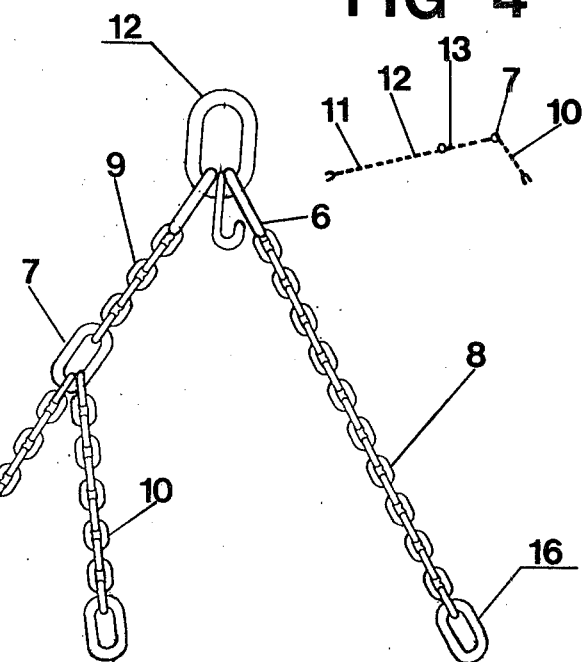

METHOD OF LAYING AND JOINING PIPES AND A LIFTING DEVICE FOR PERFORMING THE METHOD

BACKGROUND OF THE INVENTION

1. Field of the Invention

The present invention relates to a method for laying and joining pipes, especially large concrete pipes, for forming a pipe line composed of many pipes, by the aid of a two-legged lifting strap. The invention also concerns a lifting device for carrying out the method.

2. Description of the Prior Art

When heavy pipes, such as sewer pipes made of concrete, are to be mounted onto a pipe line in a trench, each pipe is usually hoisted by means of a special tool in the form of a grab hook, a lifting yoke is inserted into the pipe, such as a wire sling or the like, and the pipe is moved to position in the trench adjacent the end of the line of previously laid pipes. The joint end of a new pipe which is often provided with a rubber gasket is pushed into the socket of the previously laid pipe. Since the pipes are often very heavy and the friction in the joint is very great due to the rubber gasket, a considerable force is necessary to effect the joining of the pipes. Another problem is that the new pipe has to be connected to the previously laid pipe without the latter being moved out of its position, which may easily happen if the previously laid pipe is used for "anchoring" the force used for pushing the new pipe into position. For this reason, it is necessary to effect the joining of the pipes by the aid of a further special tool which pulls or pushes the new pipe into the pipe line by means of a lever mechanism or by hydraulic means.

The special tools used for laying the pipes as well as the ones used for joining the pipes are usually heavy, bulky and complicated and therefore also expensive to purchase and maintain, so that it is often impossible for contractors to acquire tools of their own. Furthermore, the change from the hoisting tool to the joining tool is time consuming and there is a risk that previously laid pipes will be moved out of position in connection with the mounting of a new pipe.

BRIEF SUMMARY OF THE INVENTION

The object of the invention is to provide a very simple method of joining pipes using a lifting device which is inexpensive to manufacture, reliable in operation and guarantees that the pipe is guided very exactly during the joining operation, without the risk of moving previously laid pipes out of position. This object has been attained by the method according to the invention which is characterized in that a pipe which is to be joined to the last laid pipe in the pipe line is placed in alignment in front of the end of the laid pipe, an asymmetrical two-legged lifting strap is used, the shorter leg of which is attached to that pipe, which is to be joined to the laid pipe in the pipe line, at the end portion which is nearest to the joining end, and the longer leg of the lifting strap is attached to one of the previously laid pipes of the pipe line, and to the point of connection between the legs there is connected a hoisting device by means of which a slight vertical heave is effected, resulting in the pipe being pulled in the direction towards the last laid pipe.

A lifting device for performing the method according to the invention comprises an asymmetrical two-legged lifting strap with a longer leg and a shorter leg which are interconnected at on end and are provided, at their opposite ends, with connecting means for direct or indirect connection with the pipes which are to be joined.

The device according to the invention is inexpensive to acquire, practically maintainence-free, reliable in operation, may easily be carried by one man and requires a minimum of space.

DESCRIPTION OF THE DRAWINGS

The invention will now be described in greater detail with reference to the accompanying drawings wherein:

FIG. 1 is a schematic elevational view of part of a pipe line composed of several pipes and showing a separate pipe which has been moved into joining position with the aid of a lifting device according to the invention, FIG. 2 is a view corresponding to FIG. 1 showing the lifting device in position for joining the pipes, FIG. 3 is an elevational view showing the lifting device according to FIGS. 1 and 2 on a larger scale, and FIG. 4 is a view similar to FIG. 3 on a reduced scale showing a modified embodiment of the lifting device.

DETAILED DESCRIPTION

In the drawing, numeral 1 indicates a pipe which is to be joined to the last laid down pipe 2 in a pipe line 3. In the example illustrated in the drawing, each pipe is provided with attachments 4 and 5 disposed in one and the same axial plane and dimensioned for serving as lifting eyes during transportation of the pipe.

When a pipe 1 is to be connected to the last laid pipe 2 in the pipe line, a two-legged lifting strap 6 is connected with its ends of the attachments 4 and 5. The two legs 8 and 9 of the lifting strap 6 are of equal length, whereby the pipe 1 may be hoisted and transported to the position illustrated in FIG. 1 close to and in line with the last laid pipe 2.

The two-legged symmetrical lifting strap 6 used for transportation may be transformed, in a very simple manner, into an asymmetrical two-legged lifting strap as illustrated in FIGS. 2 and 3. For this purpose, one leg 9 of the lifting strap 6 is divided into two parts 9 and 10 by means of an interconnecting member 7, for instance in the form of a ring. A further leg 11 connected to the interconnecting member 7 is of greater length than the leg 10. At the point of connection between the legs 8 and 9 there is also provided an interconnecting member 12 in the form of a ring, a shackle or the like. At the free end of each leg 8, 10 and 11 there is provided a connecting means 16 in the form of a lifting hook, a shackle, or a sling which may be placed around the pipe. The connecting means 16 may also be in the form of a magnetic or vacuum lifting device.

In order to join a pipe 1 to the end of the previously laid pipe 2 after the pipe 1 has been placed in alignment with the pipe 2 as illustrated in FIG. 1, the leg 8 of the lifting device is disconnected from the attachment 4, and the leg 11 which has previously been loosely suspended in the load hook of the hoisting device 15 is attached to one of the previously laid pipes 2, e.g. to the attachment 5 of the last laid pipe. A slight vertical heave by means of the hoisting device 15 will then cause the pipe 1 to move towards the pipe 2 having its end pressed into the socket end of the previously laid pipe 2.

The explaination for the above-described operation of the device is as follows. When an upwardly directed force is applied to the connecting member 12 of the asymmetrical lifting strap illustrated in FIG. 2, the force which acts upon the pipe 1 in the direction towards the previously laid pipe 2 will be greater than the force which tends to move the previously laid pipe 2 in the direction towards the pipe 1. The result will be that the pipe 1 will move towards the previously laid pipe 2 which will remain immoveable. This tendency is increased by the fact that the upwardly directed force at the attachment point 5 of the previously laid pipe 2 will increase the friction against the ground of the socket end portion of the previously laid pipe 2, said end portion tending to be pressed down into the ground, whereas the upwardly directed force on the joint end of the pipe 1 will tend to reduce the friction of the latter pipe against the ground. Thus, the previously laid pipe 2 will remain immoveable while the pipe 1 will have its end portion pulled into the socket end of the previously laid pipe 2.

The modified lifting strap 6 shown in FIG. 4 may also be used as either a symmetrical or asymmetrical strap. The strap consists of three parts 10, 11 and 13 interconnected by means of connecting members 7 and 12 into which a lifting hook may be inserted. The legs 10 and 13 are the same length and leg 11 is of the same length as the combined length of legs 10 and 13, so that if a lifting hook is inserted into the connecting member 7, an asymmetrical lifting strap will be obtained, and if the lifting hook is placed in the connecting member 12, there will be formed a symmetrical lifting strap.

The invention is not limited to the embodiments hereinbefore described which may be subject to several modifications within the scope of the claims. As an example, the leg parts of the lifting strap may be made of chain, steel wire, synthetic fibers or other material, and the connecting means may be of various design, such as eye bolts for connection to anchoring means moulded into the pipes, magnetic plates, vacuum plates, or slings. The lifting strap may also be connected to recesses or holes in the pipes made for the purpose. Also, the invention is not limited to those cases where the pipe is hoisted at two points as hereinbefore described, but may also with advantage be utilized in those cases when the pipes are hoisted in a single, centrally located hoisting point. In such a case, the pipe will be hoisted and moved down into the trench using only one of the two equally long legs of the lifting strap, whereafter the joining of the pipes is effected in the manner decscribed above with the strap used in its asymmetrical form. For this purpose, the embodiment of the lifting strap illustrated in FIG. 4 should be particularly useful, the pipe being hoisted and moved into position in the trench by the short leg 10 of the strap, the longer leg 11, 13 thereafter being connected to the last pipe previously laid in the pipe line.

We claim:

1. A lifting and joining device for use in laying and joining pipes end to end, especially large concrete pipes, to form a pipe line of a plurality of pipes comprising, an asymmetrical lifting strap having at least two legs, a first leg being longer than the second leg, a lifting and connecting member interconnecting said legs at one end, and pipe attaching means on the other ends adapted to be attached to the pipes to be joined, so that when said longer leg is attached to a pipe already laid and the shorter leg is attached to a pipe to be joined at a position closer to the end to be joined than the position where the longer end is connected to said laid pipe and a lifting force is applied to said lifting and connecting member, the pipe to be joined is drawn toward said laid pipe.

2. A lifting and joining device as claimed in claim 1 and further comprising a third leg formed by dividing said longer first leg into two parts, a second lifting and connecting member interconnecting said two parts at a point between the ends of said longer leg so that the length between said second lifting and connecting member and said attachment means are substantially equal.

3. A lifting and joining device for use in laying and joining pipes end to end, especially large concrete pipes, to form a pipe line of connected pipes comprising, a lifting strap having a first leg and a second leg of substantially equal length, a connecting and lifting member interconnecting one end of said legs, a third leg connected at one end to said second leg at a point between the ends of said second leg and having a length so that the length between said connecting and lifting member and the other free end of said third leg is longer than the length of said first leg, and pipe attaching means on the other free ends of said legs for removably attaching said legs to the pipes to be joined so that when said first and second legs are attached at spaced positions to a pipe to be laid and a lifting force is applied to said connecting and lifting member said pipe to be laid can be placed in position for joining to a pipe already laid, and when said first leg is detached from said pipe to be laid and said third leg is attached to said laid pipe at a distance from the end to be joined greater than the distance of the point of attachment of said second leg from the end to be joined and a lifting force is applied to the point of connection between said second and third legs, the end of the pipe to be joined will be drawn toward the end of the laid pipe to be joined.

4. A method of laying and joining pipes end to end, especially large concrete pipes, to form a pipe line of connected pipes comprising providing a two-legged lifting strap having one leg longer than the other, the legs being interconnected at one end by a lifting member and having pipe attachment means at the other ends, placing a pipe to be joined in alignment at its end with the end of a pipe already laid, attaching the end of the shorter leg of the lifting strap to the end of the pipe to be joined nearest to the joining end at a first distance therefrom, attaching the end of the longer leg to the pipe already laid at a greater distance from the joining end than said first distance, and applying a lifting force to the lifting member, so that the pipe to be joined is drawn toward said pipe already laid.

* * * * *